April 11, 1939.  A. W. HERRINGTON  2,154,045
MULTIAXLE DRIVE VEHICLE
Filed March 25, 1937  2 Sheets-Sheet 1

INVENTOR.
Arthur W. Herrington,
BY Hood + Hahn.
ATTORNEYS.

April 11, 1939.  A. W. HERRINGTON  2,154,045
MULTIAXLE DRIVE VEHICLE
Filed March 25, 1937

INVENTOR.
Arthur W. Herrington,
BY
Hood & Hahn.
ATTORNEYS.

Patented Apr. 11, 1939

2,154,045

UNITED STATES PATENT OFFICE 2,154,045

MULTIAXLE DRIVE VEHICLE

Arthur W. Herrington, Indianapolis, Ind., assignor to Marmon-Herrington Company, Inc., Indianapolis, Ind., a corporation of Indiana Application March 25, 1937, Serial No. 132,899

5 Claims. (Cl. 74—326)

The usual motor vehicle comprises a chassis frame supported at its front and rear ends upon axles which are in turn supported by wheels journaled upon the outer ends of the axles, and the vehicle is guided by swinging each of the front wheels about a substantially vertical axis.

When such a vehicle is propelled through an arc-shaped path, the steering wheels always traverse longer paths than the rear wheels and each outer wheel of each pair traverses a longer path than its companion inner wheel. This last-mentioned differential is compensated, as to wheel pairs to which power is applied, to one of many well known forms of differential gearing, and the first-mentioned differential, as to non-powered wheels is of no consequence.

In vehicles where more than one pair of powered traction wheels are provided, however, as in four-wheel drive structures, the first-mentioned distance differential becomes a factor which results in undue wear of the steering gear, tires, and an unnecessary consumption of power which cannot be compensated by the usual differential gears interposed between the power source and the transverse pairs of traction wheels.

One of the objects of my invention is to provide mechanism by means of which delivery of power to the front power-driven wheels will be automatically discontinued during arcuate travel and automatically resumed during resumption of straight-line travel irrespective of whether the vehicle is being driven forwardly or rearwardly.

A further object of my invention is to provide a structure, having the characteristics mentioned above, by means of which an ordinary two-wheel drive vehicle may be readily modified to a four-wheel drive vehicle, at low cost.

A further object of my invention is to provide a structure, of the character mentioned above, wherein a driving chain forms one of the transmission elements between the power plant and the front axle together with means by which lubrication for the drive train may be automatically controlled in such manner that, while a thorough submersion lubrication will be provided for the chain in its initial operation, subsequent lubrication of the chain will be accomplished by mere surface contact between the chain and the lubricating pool, whereby objectionable heating of the lubricant will be avoided.

In this connection attention is called to the fact that where a power transmission chain is, in a portion of its run, submerged in lubricant, high speed movements of the chain through such a lubricating pool results in such heating of the lubricant as to very seriously destroy its lubricating value. This is especially true with power transmission chains of the so-called roller type and one of the objects of my invention is to provide means by which a power transmission chain of the roller type, particularly, may be adequately lubricated but not over lubricated and the supply of lubricant will be protected against undue heating during the movement of the drive chain.

A further object of my invention is to provide convenient means by which adjustments may be made for variations in driving chain length without disassembling the driving connection between the power plant and the front axle.

The accompanying drawings illustrate my invention:

Fig. 1 is a plan of a vehicle in which my device has been incorporated;

Fig. 2 is an axial section of a unit capable of association with the rear end of the power delivery shaft of a speed varying transmission of common type to provide a chain driven power takeoff for connection with a driven steering wheel front axle structure (to be supplied) in place of the usual non-driven steering wheel axle, the structure being such that the rear wheel axle and associated propeller shaft may be utilized without chains;

Fig. 4 is a side elevation of the structure shown in Fig. 3.

Figure 1:
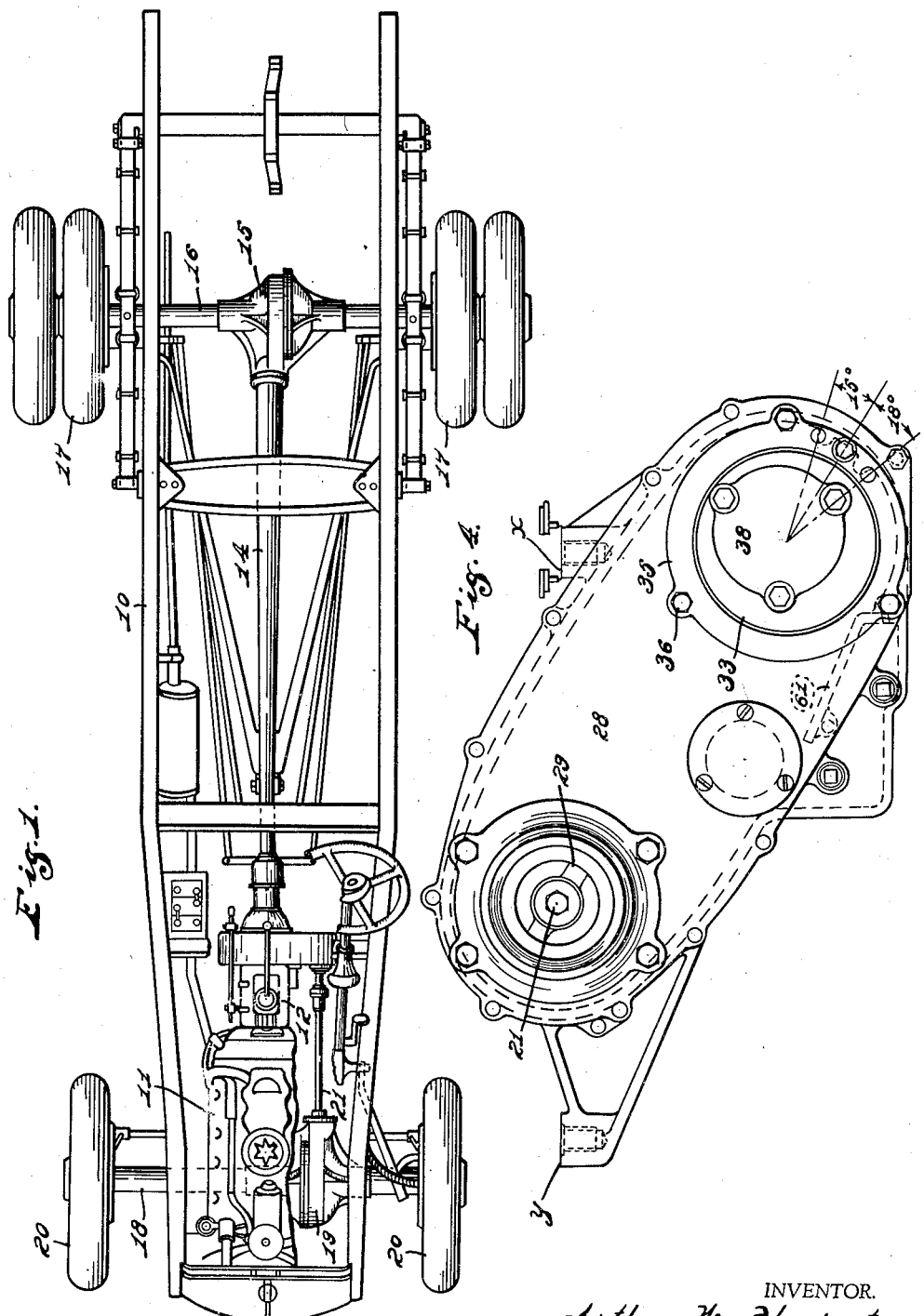
Figure 2:
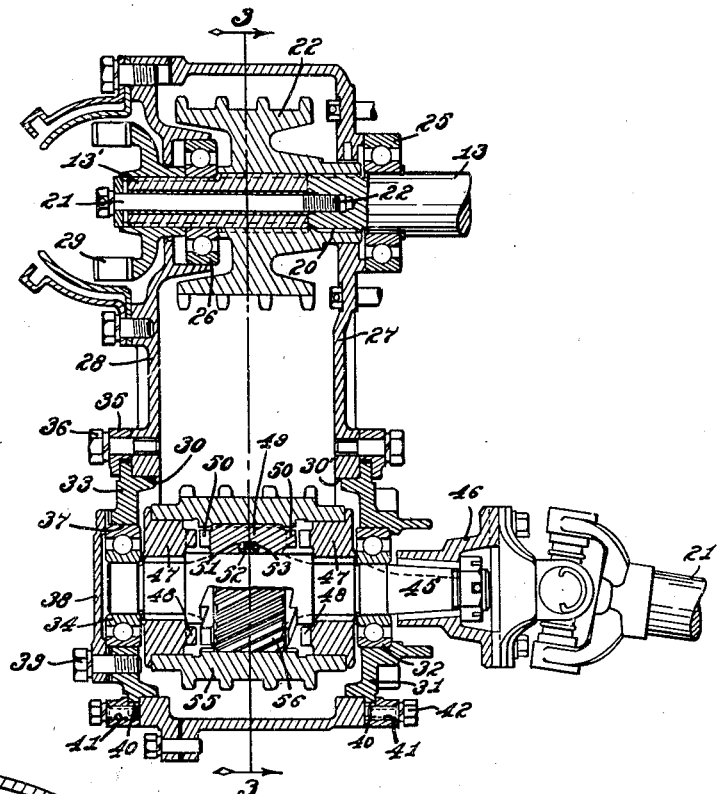
Figure 3:
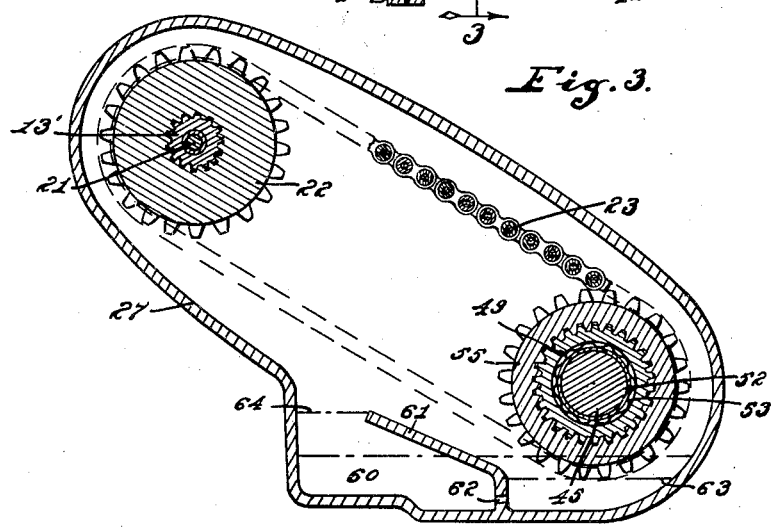
Fig. 3 is a section on line 3—3 of Fig. 2.

In the drawings, 10 indicates the chassis frame, 11 the power plant, 12 the speed varying transmission gearing provided with desirable controlling means and having a power delivery shaft 13, 14 the propeller shaft leading to the differential 15 of the rear axle 16 with its driven wheels 17, 17. A driven wheel front axle structure 18, with its differential 19, driven wheels 20, 20, and propeller shaft 21 is to be substituted for the non-driven wheel front axle usually found in a rear-wheel drive vehicle.

Shaft 13 of a standard speed varying transmission is provided at its outer end with splines 20 for the non-rotative reception of one element of a common type of universal joint connection for the rear wheel propeller shaft. In order to adapt such a structure for my present invention, I provide a splined extension element 13' which is secured to the outer end of shaft 13 by a bolt 21 threaded at 22 into the outer end of shaft 13; the splines at one end of element 13' registering with the splines 20 of shaft 13.

Splined upon splines 20 of shaft 13 and the registering splines of extension element 13' is a sprocket wheel 22 preferably of the type for reception of a roller type driving chain 23. Supported on shaft 13 and its extension by means of suitable bearings 25 and 26 is a casing 27 which forms a housing for the sprocket wheel 22, chain 23 and the parts now to be described.

Casing 27 comprises a cover element 28 through which the free end of extension 13' projects so as to receive the universal coupling element 29, by means of which the power delivery shaft is connected to the propeller shaft leading to the rear axle differential.

The side plate of casing 27 and the cover plate 28 are respectively perforated with equal-diameter aligned perforations 30 and 30'. Rotatably mounted in perforations 30' is a bearing plate 31 supporting a bearing 32, the axis of which is eccentric to the axis of that portion of plate 31 which journals in perforation 30'. A bearing plate 33 is journaled in perforation 30 and supports a bearing 34 alignable with bearing 32. Each of the bearing plates 31 and 33 is held in place by a retaining ring 35 held in place by suitable cap screws 36. In order to permit convenient access to bearing 34, plate 33 is provided with the bearing-receiving perforation 37 and this perforation is normally closed by a readily removable plate 38 held in place by cap screws 39. Each of plates 31 and 33 is provided with a peripheral series of teeth 40 and each retaining ring 35 is provided with a plurality of threaded openings 41 (say three) which are spaced apart differential distances somewhat greater than the pitch of teeth 40 so that by projecting a retaining screw 42 through a selected perforation 41 to project the inner end of said screw between an appropriate tooth pair of the bearing plate, said bearing plate may be selectively rotatively adjusted to vary the distance of the axes of bearings 32 and 34 from the axis of shaft 13.

Supported in the bearings 32 and 34 is a jack shaft 45, the forward end of which projects through bearing plate 31 to receive a standard coupling element 46 for flexible connection with the propeller shaft which leads to the front axle differential.

Keyed upon jack shaft 45 are two clutch elements 47, 47 each of which, on its inner face, is provided with ratchet clutch teeth 48, the teeth of one clutch element facing oppositely to the teeth of the other clutch element.

Journaled and axially slidable upon jack shaft 45 between the clutch elements 47, 47 is a clutch element 49, the axial length of which is less than the distance between the tips of the two ratchet tooth series 48, 48 and the ends of which carry oppositely faced ratchet teeth series 50, 50 adapted to interdigitate with the adjacent ratchet teeth 48. The bore of clutch element 49 is provided with a peripheral groove 51 within which is mounted a split friction ring 52 and a radially acting spring 53 interposed between the external periphery of friction ring 52 and the bottom of groove 51 to establish a definite frictional engagement of ring 52 with the periphery of jack shaft 45.

Journaled upon the clutch elements 47, 47 is a sprocket wheel 55 adapted to receive the chain 23. The bore of sprocket wheel 55 and the external periphery of clutch element 49 are provided with mating helical teeth 56, the arrangement being such that relative rotation of clutch element 49 and sprocket wheel 55 will cause axial reciprocation of clutch element 49.

Casing 27 is supported at suitable points X and Y on the chassis frame.

Formed in the lower part of casing 27 is an oil reservoir 60 separated by a dam 61 from that portion of the casing 27 in which sprocket wheel 55 rotates. Oil reservoir 60 is connected by one or more small bleed openings 62 with that portion of the casing 27 within which sprocket wheel 55 rotates; said bleed openings being so proportioned that, during normal running of chain 23, the level of oil immediately adjacent sprocket wheel 55 will be approximately at the line 63 just touching chain 23 and the normal level of oil in reservoir 60 during that period will be approximately at line 64. After the parts have been at rest for some time, the oil levels in the two parts of the casing 27 will be at an intermediate point which will completely submerge a short section of chain 23 at its lowest point, the arrangement being such that the first few turns of chain 23 will completely immerse the entire length of the chain in oil which will ultimately drain into reservoir 60 and thereafter, during continuous running, there will be an avoidance of submergence of the chain and there will be just enough surface contact of the chain with the oil in the lower part of the casing 27 to provide ample lubrication while at the same time preventing such churning of the oil by the movements of the chain as will result in undesirable heating of the oil.

While the vehicle is moving forwardly in approximately a straight line clutch element 49 will be in one extreme axial position in clutching engagement with the adjacent clutch element 47 and upon reversal of movement of the vehicle there will be a relative rotation between sprocket wheel 55 and clutch element 49 (rotation of 49 on 45 being obstructed by the friction element 52) to cause axial shifting of the clutch element 49 to its opposite axial extreme.

Whenever the steering wheels are tractively forwarded at a higher rate of speed than the rear driven wheels, in either direction of travel on the vehicle, there will be a relative rotation of the elements 55 and 49 sufficient to cause the clutch element 49 to move to its intermediate position where its ratchet teeth are separated from both of the series of ratchet teeth 48, 48 and this condition will persist until the vehicle is straightened out for straight-line travel whereupon the clutch element 49 will be appropriately automatically shifted to one of its extreme positions to re-establish positive driving connection with the jack shaft 45.

The structure described above makes possible a low-cost modification of a standard two-wheel drive structure into a four-wheel drive structure, to produce a four-wheel drive structure which will automatically compensate for steering wheel rotations at higher speed than rear driving wheel rotations and which will provide for ample lubrication of the driving chain while at the same time insuring against undue oil heating.

It will be readily understood that instead of the driving chain a meshing gear train between shafts 13 and 45 may be provided without departing from those portions of my invention other than the special lubrication control which, of course, may or may not be used.

I claim as my invention:
1. A power transmission unit for motor vehicles, comprising a hollow casing structure having a bearing for the reception of a power deliv- ery shaft having a splined outer end, an extension for said power delivery shaft journaled in the casing in alignment with said bearing and having a splined inner end, means by which said extension may be rigidly attached to said power delivery shaft in alignment therewith, a rotary power transmitting element splined upon the inner end of the extension shaft and splinable on the adjacent end of said power delivery shaft, a jack shaft journaled in said casing, a second rotary power transmitting element associated with said jack shaft, and power transmitting means connecting said two rotary power transmitting elements.

2. A power transmission unit for motor vehicles, comprising a hollow casing structure having a bearing for the reception of a power delivery shaft, an extension for said power delivery shaft, means by which said extension may be attached to said power delivery shaft, a rotary power transmitting element non-rotatably associated with said extension and non-rotatably associable with the end of said power delivery shaft, a jack shaft journaled in said casing, a second rotary power transmitting element associated with said jack shaft, power transmitting means connecting said two rotary power transmitting elements, a pair of ratchet tooth clutch elements carried by the jack shaft and having oppositely set ratchet teeth, a clutch element rotatably and slidably mounted upon the jack shaft between said clutch elements and having an overall length less than the distance between the ratchet teeth of said two clutch elements and having at its ends oppositely set ratchet teeth matable with the ratchet teeth of the adjacent first-mentioned clutch elements, and a helical splined connection between said axially shiftable clutch element and the said second rotary power transmitting element.

3. A power transmission unit comprising, a casing, a shaft journaled in one wall of the casing and projecting thereinto, a second shaft axially aligned with the first shaft journalled in the opposite wall of the casing and projecting thereinto, power-transmitting means connecting said two shafts for concurrent rotation, a third shaft journalled in one wall of said casing and projecting thereinto, two oppositely-set axially-spaced ratchet-toothed clutch elements non-rotatively associated with said third shaft within the casing, an intermediate clutch element rotatable and axially shiftable on said third shaft between said two oppositely-set clutch elements and having an overall length less than the distance between the teeth of said two clutch elements with oppositely set ratchet teeth at its two ends each toothed end being non-rotatively matable with one of said two clutch elements, a power-transmission element driven by the first-mentioned shaft and sleeved over and housing said three clutch elements and rotatively interlocked with said intermediate clutch element by helical interlocking elements such that relative rotation between said last-mentioned power-transmission element and said intermediate clutch element will produce axial movement of the intermediate clutch element.

4. A power transmission unit comprising a casing, a primary shaft journaled therein, a secondary shaft journaled in said casing, two oppositely-faced ratchet-tooth clutch elements keyed to said secondary shaft, an axially shiftable clutch element journaled upon said secondary shaft between the first-mentioned clutch elements and having an overall length less than the distance between said first-mentioned clutch elements and having, at each end, ratchet teeth matable with the teeth of the adjacent clutch element, a friction element interposed between said axially shiftable clutch element and the secondary shaft to restrain relative rotation, a power transmission element sleeved over said clutch elements freely rotatable relative to the first-mentioned clutch element by helical interlocking elements such that relative rotation between said power transmission element and said axially shiftable clutch element will produce axial movement of said axially shiftable clutch element, and driving connections between the first-mentioned shaft and said rotary power transmitting element.

5. A power transmission unit comprising a casing, a primary shaft journaled therein, a secondary shaft journaled in said casing, a pair of axially spaced ratchet-tooth clutch elements connected to said secondary shaft and each having upon its inner face, ratchet teeth set oppositely to the teeth of the companion clutch element, a third clutch element rotatable and axially shiftable upon said secondary shaft between the first-mentioned clutch elements and having an overall length of less than the distance between the ratchet teeth of said first-mentioned clutch elements and having, at each end, ratchet tooth clutch elements matable with the adjacent clutch elements, a friction element interposed between said axially shiftable clutch element and the secondary shaft to restrain relative rotation, a rotary power transmitting element sleeved over and journaled upon the two first-mentioned clutch elements, a helical splined connection between said third clutch element and said rotary power transmitting element whereby relative rotation will produce axially shifting of said third clutch element, and driving connections between the first-mentioned shaft and said rotary power transmitting element.

ARTHUR W. HERRINGTON.